US007617856B2

(12) United States Patent
Gnan

(10) Patent No.: US 7,617,856 B2
(45) Date of Patent: Nov. 17, 2009

(54) APPARATUS FOR THE MANUFACTURE OF CORRUGATED BOARD

(75) Inventor: Alfons Gnan, Vilseck (DE)

(73) Assignee: BHS Corrugated Maschinen- und Anlagenbau GmbH, Weiherhammer (DE)

( * ) Notice: Subject to any disclaimer, the term of this patent is extended or adjusted under 35 U.S.C. 154(b) by 352 days.

(21) Appl. No.: 11/548,884

(22) Filed: Oct. 12, 2006

(65) Prior Publication Data

US 2007/0084565 A1 Apr. 19, 2007

(30) Foreign Application Priority Data

Oct. 14, 2005 (EP) ................................ 05022417

(51) Int. Cl.
*B31F 1/00* (2006.01)
*B31F 1/20* (2006.01)
*B23Q 3/155* (2006.01)
*B23Q 3/157* (2006.01)

(52) U.S. Cl. ....................... 156/462; 156/210; 156/470; 483/17; 483/30

(58) Field of Classification Search ................. 156/446, 156/448, 462, 470, 471, 472, 473, 465, 205, 156/207, 208, 210; 72/238, 239; 483/17, 483/30
See application file for complete search history.

(56) References Cited

U.S. PATENT DOCUMENTS 3,540,253 A * 11/1970 Kollek et al. .................. 72/239
3,638,468 A * 2/1972 Fukui et al. ................... 72/238
3,926,027 A * 12/1975 Krumme ...................... 72/239
4,222,258 A 9/1980 Field
4,627,831 A 12/1986 Hirakawa et al.
4,629,526 A * 12/1986 Kanda ........................ 156/210
5,150,514 A * 9/1992 Seki et al. ..................... 29/824
5,950,477 A * 9/1999 Matsunaga ................... 72/239
2003/0075263 A1 4/2003 Marschke

FOREIGN PATENT DOCUMENTS

DE 36 35 638 C1 4/1988
JP 05 177749 A 7/1993

OTHER PUBLICATIONS

European Search Report and Written Opinion for EP Application No. 05 022 417.

* cited by examiner

*Primary Examiner*—Jeff Aftergut
*Assistant Examiner*—Brian R Slawski
(74) *Attorney, Agent, or Firm*—James B. Conte

(57) ABSTRACT

An apparatus for the manufacture of corrugated board has a housing, in which the following are accommodated: a corrugating roller unit for the production of a corrugated web out of a material web, comprising corrugating rollers adjacent to each other, a gluing device for applying glue to the corrugated web and a pressing device for pressing the corrugated web, to which glue has been applied, to a liner. Outside the housing, a corrugating roller unit loader is arranged with a plurality of corrugating roller unit holders. These each serve to accommodate one corrugating roller unit. The corrugating roller unit loader is displaceable with respect to the housing and guided between loader positions such that in each of the loader positions, a loader guiding portion of one of the corrugating roller unit holders aligns with a housing guiding portion to move a corrugating roller unit, which is accommodated in the corrugating roller unit holder, between a loader holding position and a housing operating position. This results in a manufacturing apparatus in which a plurality of corrugating roller units can be provided at a low cost.

6 Claims, 3 Drawing Sheets

APPARATUS FOR THE MANUFACTURE OF CORRUGATED BOARD

BACKGROUND OF THE INVENTION

1. Field of the Invention

The invention relates to an apparatus for the manufacture of corrugated board with a housing, with a corrugating roller unit for the production of a corrugated web from a material web, comprising corrugating rollers adjacent to each other, with a gluing device for applying glue to the corrugated web, with a pressing device for pressing the corrugated web, to which glue has been applied, to a liner, the corrugating roller unit, the gluing device and the pressing device being arranged inside the housing.

2. Background Art

Such a manufacturing apparatus is known from U.S. Pat. No. 5,632,850. Single-faced corrugated board is manufactured with such a manufacturing apparatus. The market demands this type of corrugated board with different fluting, for which for example standards exist. An appropriate corrugating roller unit is necessary in each case for the manufacture of corrugated board with each specific fluting. It is therefore necessary for the efficient utilization of the work equipment for the manufacturing apparatus to be constructed such that it can be operated with various interchangeable corrugating roller units. In the case of the known manufacturing apparatus, the changeover of the corrugating roller units is achieved with a very complicated construction.

SUMMARY OF THE INVENTION

It is therefore an object of the present invention to improve a manufacturing apparatus of the type described at the beginning, such that a plurality of corrugating roller units for the manufacturing apparatus can be provided in a less complicated way in comparison to the prior art.

This object is achieved according to the invention through a manufacturing apparatus with a corrugating roller unit loader arranged outside the housing with a plurality of corrugating roller unit holders, each for accommodating one corrugating roller unit, the corrugating roller unit loader being displaceable with respect to the housing and guided between a plurality of loader positions, such that in each of the loader positions a loader guiding portion of one of the corrugating roller unit holders aligns with a housing guiding portion to move a corrugating roller unit that is accommodated in the corrugating roller unit holder between a loader holding position and a housing operating position.

In particular single-faced corrugated board can be manufactured with the manufacturing apparatus according to the invention. The invention is not, however, restricted to the manufacture of single-faced corrugated board. A space-saving provision of a plurality of corrugating roller units in particular is ensured by using a corrugating roller unit loader. The storing, loading and transfer into the operating position of the respective corrugating roller unit takes place in a defined guided way, so that a fast, standardized and therefore easily repeatable changeover of the corrugating roller units is ensured.

Guiding the corrugating roller unit loader on a guide having rails extending transversely to the guide direction when the corrugating roller unit is displaced between the loader holding position and the housing operating position allows a particularly compact arrangement of the corrugating roller units that are to be provided.

A driving device for the displacement of the corrugating roller unit loader between the loader positions makes the changeover between various corrugating roller units easier.

That is also the case for a driving device for the displacement of the corrugating roller unit between the loader holding position and the housing operating position.

Additionally a driving device having a gear rack which is fixed to the corrugating roller unit and into which a drive pinion fixed to the housing engages is constructed simply and reliably.

An alignment device for aligning the loader guiding portions to the housing guiding portion into the loader positions reduces the demands on manufacturing tolerances for the corrugating roller unit loader.

An alignment device having a plurality of alignment members fixed to the housing and an alignment body fixed to the loader, the alignment members mating with one another in an alignment position, is achievable with a less complicated construction.

An alignment device in which the alignment members fixed to the housing can be fixed finely positioned in relation to the housing, in particular via a slot positioning, allows neat positioning of the individual loader positions.

A modular extendibility of the corrugating roller unit loader, in which each corrugating roller unit loader module has at least one corrugating roller unit holder to accommodate a corrugating roller unit, allows an adaptation of the manufacturing apparatus to changing market and efficiency factors.

Embodiments of the invention are described in more detail below and in the drawings.

DESCRIPTION OF THE PREFERRED EMBODIMENTS

Figure 1:
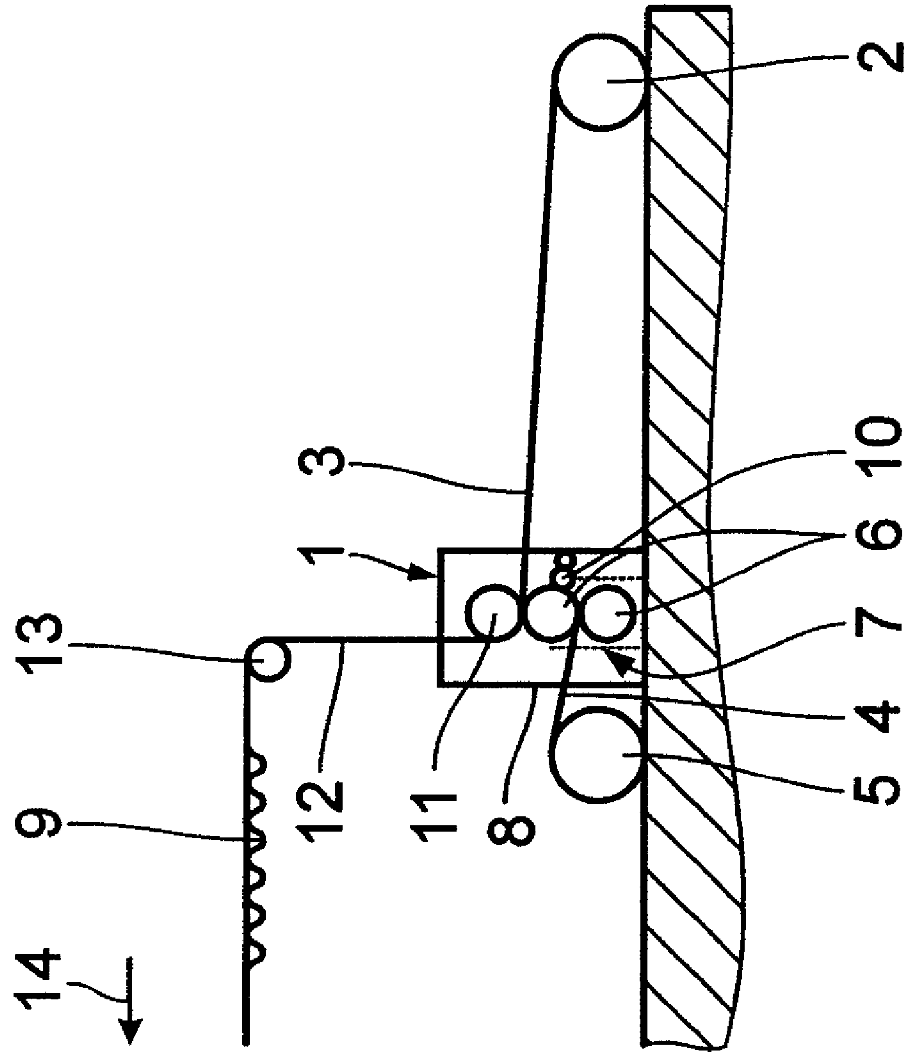
FIG. 1 schematically shows an apparatus for the manufacture of corrugated board schematically, as part of a corrugating system not otherwise illustrated.

FIG. 1 shows a detail of a corrugating system not illustrated in other respects, namely an apparatus 1 for the manufacture of single-faced corrugated board. A first material web 3 is fed into the machine 1 from a first take-off roller 2. The material webs are continuous paper webs. The material web 3 is a liner for the corrugated board manufactured in the manufacturing apparatus 1. The first material web 3 is guided together in the manufacturing apparatus 1 with a second material web 4, which is unwound from a second take-off roller 5. To produce fluting, the material web 4 is fed, after take-off, through the manufacturing apparatus 1 between two corrugating rollers 6 arranged adjacent to each other of a corrugating roller unit 7, which is provided inside a housing 8 of the manufacturing apparatus 1 in a housing operating position.

At the end of this process, the second material web 4 is in the form of a corrugated web 9. Glue is then applied to the corrugated web 9 in a gluing device 10. After this, the corrugated web 9 with glue applied to it is pressed together with the first material web 3, i.e. the liner, in the manufacturing apparatus 1 in a gap between a pressing roller 11 which is a pressing device and one of the two corrugating rollers 6 and bonded to each other with glue. The resulting single-faced corrugated board web 12, consisting of liner 3 and corrugated web 9, is carried away upwards, around a deflection roller 13 in a direction of operation 14 to be further processed. As regards its method of operation, such a manufacturing apparatus is known per se for example from EP 0 687 552 A (corresponding to U.S. Pat. No. 5,632,850).

The corrugating roller unit 7 in the housing operating position, the gluing device 10 and the pressing roller 11 are arranged inside the housing 8.

Figure 2:
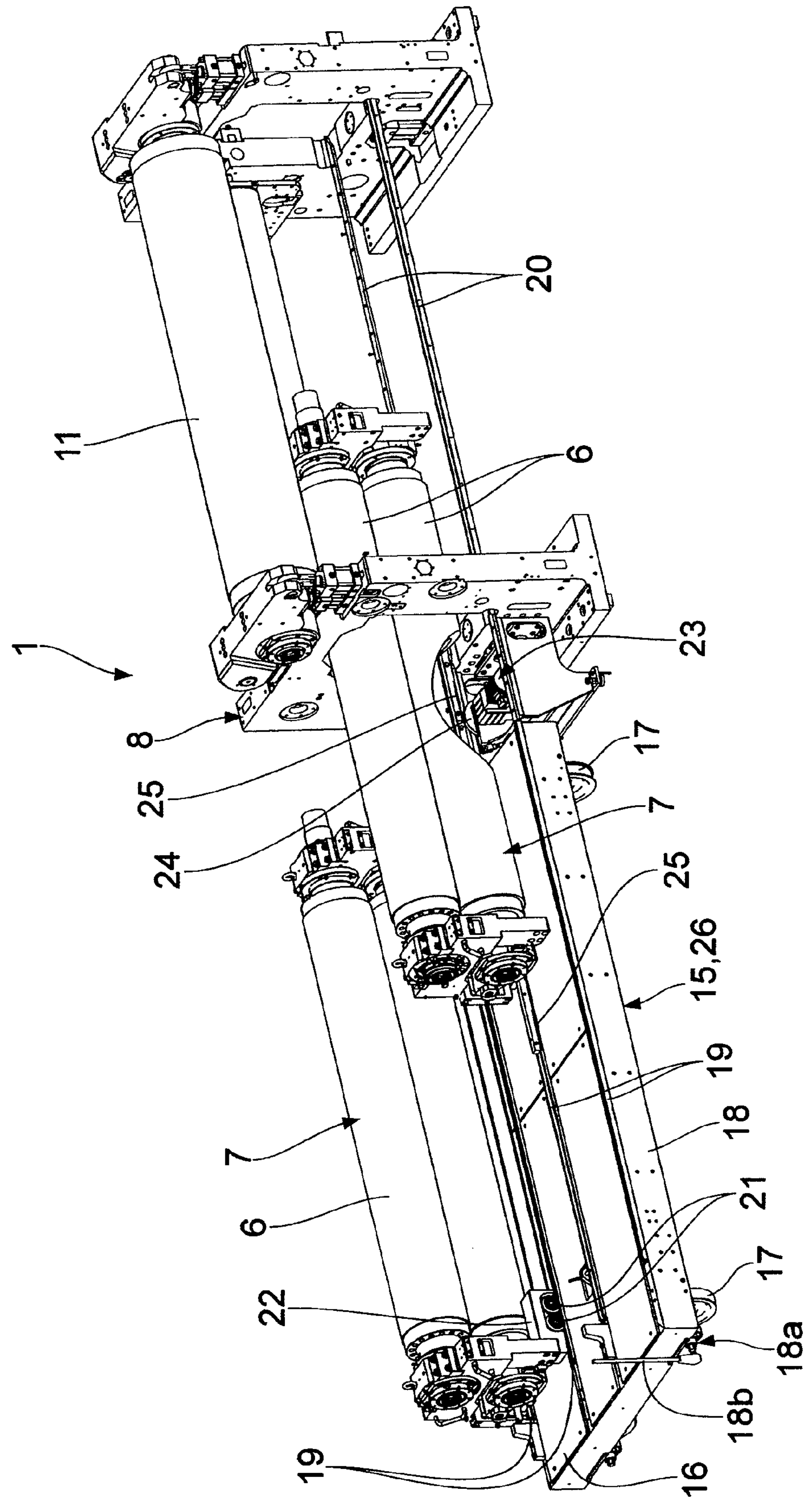
FIG. 2 shows a perspective view of the manufacturing apparatus, the covers of the housing being removed and components that are not of interest being shown in simplified form.

A corrugating roller unit loader 15, which is illustrated in FIG. 2, is arranged outside the housing 8. The corrugating roller unit loader 15 has a plurality of—and two in the embodiment shown in FIG. 2—corrugating roller unit holders 16. These serve to accommodate one corrugating roller unit 7 each. In FIG. 2, two corrugating roller units 7 are illustrated. The right-hand of the two corrugating roller units 7 shown in FIG. 2, which is referred to hereinafter as the first corrugating roller unit 7, is illustrated in a position between the housing operating position and a loader holding position. The corrugating roller unit 7 on the left in FIG. 2, which is referred to hereinafter as the second corrugating roller unit 7, is illustrated in a loader holding position.

The corrugating roller unit loader 15 is displaceable with respect to the housing 8, of which only front walls are illustrated in FIG. 2, and guided between loader positions. In FIG. 2 the loader position is illustrated in which the first corrugating roller unit 7 is displaceable between the loader holding position and the housing operating position. In a second loader position of the corrugating roller unit loader 15, the second corrugating roller unit 7 can be displaced between the loader holding position and the housing operating position.

The difference between the two corrugating roller units 7 is in the construction of the corrugating rollers, for example in the depth or width of the corrugations made, so that a differently fluted corrugated web 9 is produced for the manufacture of corrugated board 12, depending on the corrugating roller unit 7 used in the housing operating position.

The guided displacement of the corrugating roller unit loader 15 with respect to the housing 8 is effected by running wheels 17, which are mounted on a loader frame 18, rolling along linear guide rail, (not illustrated) fixed to the base of the machine. A manually operable ratchet drive 18*a* with an operating lever 18*b* serves to displace the corrugating roller unit loader 27 between the loader positions.

In each of the two loader positions, a loader guiding portion of one of the corrugating roller unit holders 16, formed by guide rails 19, aligns with a housing guiding portions, likewise formed by guide rails 20, for the displacement of the corrugating roller unit 7 accommodated in this corrugating roller unit holder 16 between the loader holding position and the housing operating position. In this aligned position, the guide rails 20 therefore continue the guide rails 19 without a join, so that the corrugating roller unit 7 can be displaced between the loader holding position and the housing operating position by running wheels 21, which are mounted on a carrying frame 22 of the corrugating roller unit 7. This displacement is driven by a driving device 23. This comprises a drive pinion 24, mounted fixed to the housing, which engages in a gear rack 25 fixed on the corrugating roller unit 7. In the case of the first corrugating roller unit 7, a guide frame on the base together with the running wheels 21 are not illustrated, in order to make the driving device 23 visible. For the same reason, a piece of the lower corrugating roller 6 of the first corrugating roller unit 7 is missing in the region of the driving device 23 in the drawing according to FIG. 2.

The rails guiding the corrugating roller unit loader 15 with respect to the housing 8 run transversely, in the embodiment according to FIG. 2 perpendicularly, to the guide direction predetermined by the guide rails 19, 20 for the displacement of the corrugating roller unit 7 between the loader holding position and the housing operating position. The displacement of the corrugating roller unit loader 15 with respect to the housing 8 between loader positions is effected using a driving device. This can be configured to be operated either manually or by a motor.

An alignment device, which is not illustrated in detail in the embodiment according to FIG. 2, serves to align the guide rails 19 relative to the guide rails 20 in the respective loader positions.

The corrugating roller unit loader 15 may be expanded in modules. Each of the corrugating roller unit loader modules 26 has at least one corrugating roller unit holder 16 to accommodate a corrugating roller unit 7.

The corrugating roller units 7 that are necessary for the efficient operation of the manufacturing apparatus 1 are provided in the corrugating roller unit loader 15. The changeover from a corrugating roller unit 7 currently in the housing operating position to another one provided in the corrugating roller unit loader 15 takes place in the following way: first the corrugating roller unit loader 15 is displaced with respect to the housing 8 into a loader position, in which the guide rails 19 of an empty corrugating roller unit holder 16 align with the guide rails 20. Then the corrugating roller 7, which is still in the housing operating position, is separated from its various supply tubes and released so that it can roll freely on the guide rails 20. This corrugating roller unit 7 is then transferred via the guide rails 20 and 19 with the help of the driving device 23, from the housing operating position to the loader holding position and re-secured in this position. Then the corrugating roller unit loader 15 is transferred to the loader position in which the corrugating roller unit 7 to be transferred to the housing operating position is located, so that the guide rails 19 assigned to it align with the guide rails 20 fixed to the housing. The corrugating roller unit 7 on the corrugating roller unit loader 15 that is to be transferred is subsequently released, so that it can roll freely on the guide rails 19. Driven with the help of the driving device 23, the corrugating roller unit 7 to be transferred is then transferred from the loader holding position to the housing operating position, rolling along the guide rails 19 and 20 with the running wheels 21. The corrugating roller 7 to be transferred is then secured in the housing operating position and connected. The manufacturing apparatus 1 is then ready to be operated with the exchanged corrugating roller unit 7.

Figure 3:
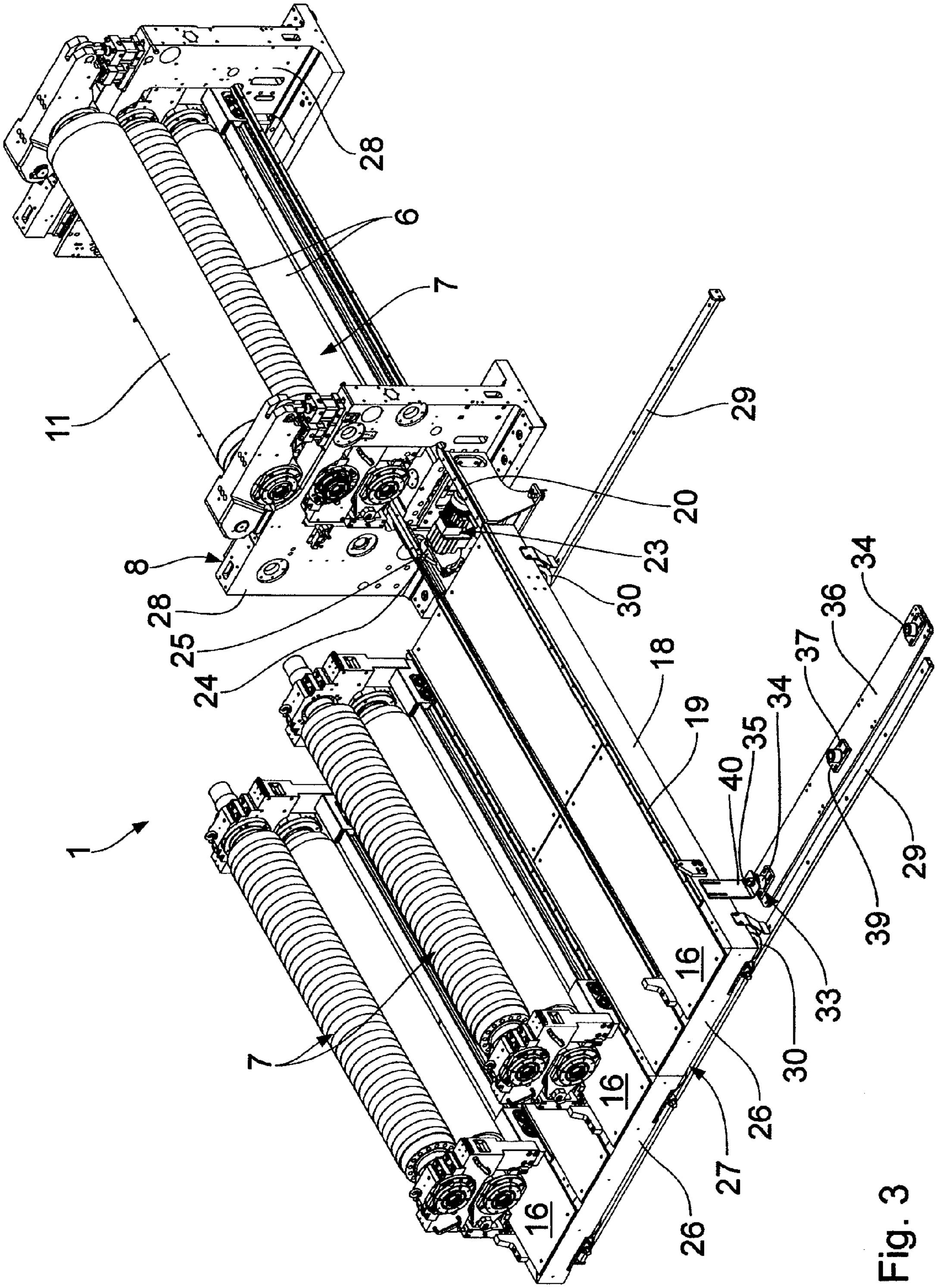
FIG. 3 shows a view similar to FIG. 2 of another embodiment of a manufacturing apparatus for corrugated board, in which an alternative corrugating roller unit loader is illustrated.

FIG. 3 shows another embodiment of a corrugating roller unit loader 27. Front end housing wall portions 28 of the housing 8 of the corrugating roller unit loader 27 are illustrated in FIG. 3. The embodiment according to FIG. 3 is only described hereinafter where it differs in its construction and method of operation from the one according to FIGS. 1 and 2. The corrugating roller unit loader 27 has a total of three corrugating roller unit holders 16. The corrugating roller unit loader 27 is displaceable with respect to the housing 8 along guide rails 29 fixed to the base of the machine, the corrugating roller unit loader 27 rolling on runners 30 fixed to the loader frame.

An alignment device 33 serves to align the lined-up position of the guide rails 19 on the side of the loader with the guide rails 20 on the side of the housing in the respective loader position. The alignment device has a plurality of alignment members in the form of alignment bushings 34 fixed to the housing, namely fixed to the base of the machine and an alignment body fixed to the loader in the form of an alignment bolt 35.

The alignment bushings 34 are fixed to a mounting rail 36 that runs parallel to the guide rails 29. To finely position the alignment bushings 34 with respect to the mounting rail 36 in the guide direction of the guide rails 29, the mounting rail 36 has slots 37 penetrated by fixing bolts that fix a locating plate 39 of the alignment bushing 34 onto the mounting rail 36.

The alignment bolt 35 is fixed onto the loader frame 18 via a bracket 40.

FIG. 3 shows the corrugating roller unit loader 27 in an alignment position for the corrugating roller unit holder 16 shown arranged furthest on the right in FIG. 3. To align this corrugating roller unit holder 16, the alignment bushing 34 was positioned on the mounting rail 36 via the slots 37 with the aid of the slot positioning means in the guide direction of the guide rails 29, such that an exact alignment was achieved between the guide rails 19 of this corrugating roller unit holder 16 and the guide rails 20 on the side of the housing. In this position, the alignment bushing 34 was then fixed by tightening the fixing bolt. In this alignment position the alignment bolt 35 engages from above into this alignment bushing 34, so that the two alignment members 34, 35 mate with one another.

An alignment of the assembly positions of the two other corrugating roller unit holders 16 is effected correspondingly by the two other alignment bushings 34, arranged below further to the right in FIG. 3., along the mounting rail 36, so that their guide rails 19 align exactly with the guide rails 20 on the side of the housing.

What is claimed is:

1. Apparatus (1) for the manufacture of corrugated board (12)

with a housing (8), with a corrugating roller unit (7) for the production of a corrugated web (9) from a material web (4), comprising corrugating rollers (6) adjacent to each other, with a gluing device (10) for applying glue to the corrugated web (9), with a pressing device (11) for pressing the corrugated web (9), to which glue has been applied, to a liner (3), the corrugating roller unit (7), the gluing device (10) and the pressing device (11) being arranged inside the housing (8), with a corrugating roller unit loader (15; 27) arranged outside the housing (8) with a plurality of corrugating roller unit holders (16), each for accommodating one corrugating roller unit (7), the corrugating roller unit loader (15; 27) being displaceable with respect to the housing (8) and guided between a plurality of loader positions, such that in each of the loader positions a loader guiding portion (19) of one of the corrugating roller unit holders (16) aligns with a housing guiding portion (20) to move a corrugating roller unit (7) that is accommodated in the corrugating roller unit holder (16) between a loader holding position and a housing operating position, and with an alignment device (33) for aligning the loader guiding portions (19) to the housing guiding portion (20) into in the loader positions, the alignment device (33) having a plurality of alignment members (34) fixed to the housing and an alignment body (35) fixed to the loader, the alignment members (34) and the alignment body (35) mating with one another in an alignment position, and wherein the position of the alignment members (34) fixed to the housing (8) can be finely adjusted via a slot positioning (37, 38) in a direction parallel to the displacement of the corrugating roller unit loader (l5, 27).

2. Apparatus according to claim 1, wherein during displacement with respect to the housing (8), a guide (17; 29; 30) of the corrugating roller unit loader (15; 27) has rails (29), which extend transversely to the guide direction when the corrugating roller unit (7) is displaced between the loader holding position and the housing operating position.

3. Apparatus according to claim 1, comprising a driving device (18*a*) for the displacement of the corrugating roller unit loader (27) between the loader positions.

4. Apparatus according to claim 1, comprising a driving device (23) for the displacement of the corrugating roller unit (7) between the loader holding position and the housing operating position.

5. Apparatus according to claim 4, wherein the driving device (23) has a gear rack (25) which is fixed to the corrugating roller unit (7) and into which a drive pinion (24) fixed to the housing engages.

6. Apparatus according to claim 1, wherein the corrugating roller unit loader (15; 27) may be expanded in modules, each corrugating roller unit loader module (26) having at least one corrugating roller unit holder (16) to accommodate a corrugating roller unit (7).

* * * * *